Dec. 2, 1930.　　　C. R. MacDONALD　　　1,783,575
APPARATUS FOR COATING ROOFING UNITS
Original Filed March 13, 1926　　8 Sheets-Sheet 1

Fig. 1.

Inventor:
C. R. MacDonald

Dec. 2, 1930.  C. R. MacDONALD  1,783,575
APPARATUS FOR COATING ROOFING UNITS
Original Filed March 13, 1926   8 Sheets-Sheet 3

Dec. 2, 1930.  C. R. MacDONALD  1,783,575
APPARATUS FOR COATING ROOFING UNITS
Original Filed March 13, 1926  8 Sheets-Sheet 4

Patented Dec. 2, 1930

1,783,575

UNITED STATES PATENT OFFICE

CHESTER R. MacDONALD, OF RUTHERFORD, NEW JERSEY, ASSIGNOR, BY MESNE ASSIGNMENTS, TO THE PATENT AND LICENSING CORPORATION, OF BOSTON, MASSACHUSETTS, A CORPORATION OF MASSACHUSETTS

APPARATUS FOR COATING ROOFING UNITS

Original application filed March 13, 1926, Serial No. 94,377. Divided and this application filed October 24, 1927. Serial No. 228,130.

This application is a division of my copending application Serial No. 94,377, filed March 13, 1926, for method of coating roofing units. The invention has relation generally to the production of roofing materials, and particularly to those which comprise a fibrous foundation made resistant to water, wear and weather by the application thereto of suitable waterproofing and wear-resisting substances. Ordinarily a bibulous felt produced on paper-making machinery from a furnish comprising rags, cellulosic material, hair, wool or asbestos or the like, is employed as the foundation and the sheet is saturated with asphalt while the latter is in a liquid condition,—usually when molten. The saturated sheet is ordinarily coated on one or both faces with asphalt, usually a relatively high melting point blown asphalt, and is surfaced on one or both faces with a mineral material, such as crushed slate, sand, fine pebbles or the like. The sheet of saturated, coated and surfaced felt, is then cut into individual roofing units, such as individual shingles or strip shingles, so called, of various sizes and designs. Because of the fact that the finished sheet is ordinarily flat and relatively thin, a roof covered with such roofing units presents a thin and relatively unsubstained appearance. An additional disadvantage flows from the cutting of the finished sheet since the fibers and the asphalt are exposed at the cut edges to the action of the elements, thereby causing a more rapid disintegration of the unit.

This invention has for its object to provide a method of and machine for sealing and thickening the butt portions of roofing units, such as individual shingles or shingle strips, which have been formed of either unsaturated felt or of felt which has been saturated, coated and surfaced, as hereinbefore described, or its equivalent. A further object of the invention is to provide means for handling individual pre-cut strips and carrying them through a process of butt thickening automatically.

According to my invention, a suitable coating material (e. g. asphalt) may be applied to the butt portions of the roofing units and allowed to drain somewhat while the units are maintained in a substantially vertical position. Under the influence of gravity and surface tension, the coating fluid tends to gather to some extent, depending largely on the viscosity of the fluid, toward the butt edge so that the resulting coat is tapered in thickness from the butt edge toward the head portion of the unit, and the edges sealed by an envelope of the coating material.

Another object of the invention is to provide means for completely surfacing the butt edge of the strip with grit or equivalent material and for rounding off the butt edge.

Another object of the invention is to provide means for applying different kinds or colors of grit or comminuted surfacing material to the two sides of the strips.

Other objects and advantages will be manifest to one skilled in the art from the disclosure in the drawings in which,—

Figures 1, 1a and 1b together represent a side elevation of a machine for carrying out one method of thickening the butts of roofing units and further treating, the side frame being broken away to show more clearly the operating parts.

Figure 3 is a transverse section of the machine on the line 3—3 of Figure 1a.

It may be again stated that the roofing elements, which are subjected to the process and to the operation of the machine to be described, are first formed in any suitable sizes and shapes by any suitable machinery. While for most purposes, I propose to treat those elements which have been cut from a sheet of saturated, coated and mineral-surfaced fibrous material, nevertheless, the elements may be cut from an unsaturated sheet, or one which has been saturated, and, if desired, coated.

As will be explained, the elements to be treated are successively and automatically subjected to a coating operation, and then to a surfacing operation, and finally discharged in a finished condition.

Figure 1:
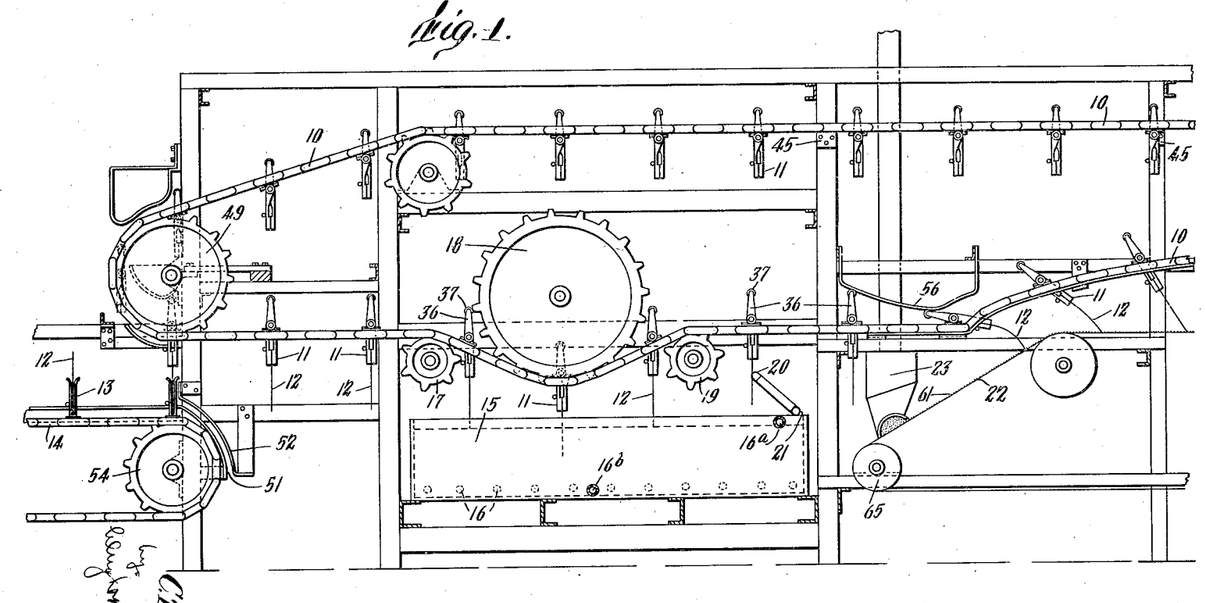
Figure 1A:
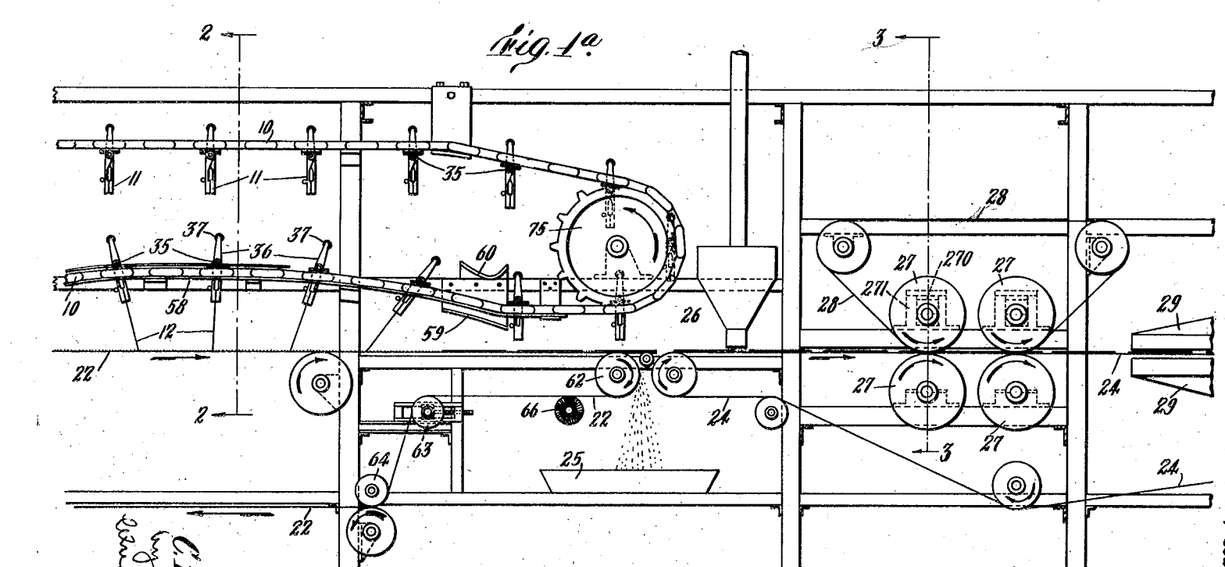

Referring to the embodiment of my invention illustrated in Figures 1–7, 10 indicates a pair of endless conveyors, preferably in the form of chains, to which may be attached suitable clamping devices 11 at regular intervals adapted to seize each individual roofing unit and carry it through the successive steps of the process. As shown in Figures 1, 1a and 1b, the successive clamps 11 pick up individual roofing units 12 which as stated may be shingle strips or shingles of any kind or size of raw or saturated roofing felt, roofing "seconds", or other equivalent material, or of coated and slated material. In several figures of the drawing where shingle strips are shown, the form illustrated is one having the outline shown in Figure 13, with slots or cut-outs extending upwardly from its butt edge. These units may be supplied by a succession of holders 13 traveling on a conveyor 14 so arranged as to bring the successive roofing units 12 into positions where they can be picked up by the successive clamps 11, as will be described hereinafter in more detail. Instead of a mechanism for supplying the units 12, the feeding may be done by hand or by any other desired method. The clamps 11 carry the units from the holders 13 over a suitable receptacle 15 which contains a coating liquid, such as blown asphalt or any other desired equivalent which may be heated electrically, by steam pipes 16, or by other means, to a suitable temperature to regulate the viscosity of the liquid for the thickness of coating desired. Supply and drain pipes 16a, 16b may be connected with the container 15. The conveyors 10 are preferably led over sprocket wheels 17, 18, 19, which are so disposed as to lower the clamps 11 with the roofing units they carry as they pass over the receptacle 15. The guiding sprocket wheels are so arranged that each shingle strip will be dipped to a desired depth in the coating fluid, and will thereupon be removed from the coating fluid, both the dipping and the removal taking place while the shingle strip is maintained in a substantally vertical position. The entire surface of the submerged portion of the strip will be completely covered with the coating compound, including all the edges of the cut-outs. During its removal and subsequently while the strip is in a vertical position, it is obvious that the coating will tend to flow and drain toward the bottom edge of the strip, thus assuming a tapered form with maximum thickness at the butt edge of the strip. A wiping device, which is preferably in the form of a steam pipe 20, may be positioned so as to engage each strip at its butt edge, and thus to remove the drippings of coating material therefrom. In order to be adjustable for strips of differing height, the pipe 20 may be pivotally mounted as by an elbow 21 so as to be raised or lowered at will. From the dipping vat, the shingle strip is carried to a suitable conveyor 22 which may comprise an endless belt arranged to receive comminuted surfacing material on its surface from a suitable hopper 23 and to be led by guide rolls so as to engage the butt edge of the successive shingle strips as they are carried from the coating vat. Any desired surfacing material, such as crushed slate, grit, powdered mica or chalk, electrically conducting granules or powder (desirable when the strip is to be electroplated), cork, sawdust, or other equivalents, may be supplied to the belt 22 from the hopper 23. For brevity, this material will be hereinafter referred to generically as "grit", it being understood that any desired comminuted material may be included in the term. Before contacting with the grit-covered belt 22, each strip is preferably tilted backwardly by means to be described in detail hereinafter, so as to project the butt edge forwardly just before it comes in contact with the grit-covered belt. The relative speeds of the conveyor 10 and the belt 22 are so regulated that the upper portion of the shingle will be carried along faster than the lower portion. In this way, the head portion of the backwardly tilted shingle will overtake the forwardly extending butt portion so that the backward tilt will change to a forward tilt while the edge remains in contact with the grit on the belt. This is shown clearly in Figure 1a. As a result, the butt edge of each strip is simultaneously rounded off and surfaced with the grit or other surfacing material on the belt 22. This effect is illustrated in the conventional cross section of a portion of the finished strip shown in Figure 10.

When the strip, as it travels along, has been tilted forwardly to a sufficient degree, tripping means engage and open the clamp, holding it so that the strip is allowed to fall forwardly on the grit-covered belt 22. This brings the entire forward face of the strip in contact with the grit on the belt, with the result that sufficient grit sticks to the coated portion of the forward face to surface the coating. The belt is thereupon carried along and transferred to another conveyor or belt 24, the excess slate on the belt 22 dropping into a suitable receptacle 25 as the strip passes from one belt to the other. The conveyor 24 carries the strip beneath a suitable hopper 26 which deposits grit upon the upper surface of the strip, whereupon the strip may be led between press rolls 27 of which four are shown, although any desired number may be supplied. These press rolls may be cooled by the circulation of water therethrough, or by any other means, and a guide belt 28 may be led around the upper rolls. If desired, the unit may then be led through a further cooling device, such as that indicated at 29, after which it may be deposited in a suitable receptacle or conveyor 30 which is preferably so constructed as to allow excess slate from the top surface of the strip and from the belt 24 to fall through into a container or hopper 31.

Figures 2, 4, 9, 10:
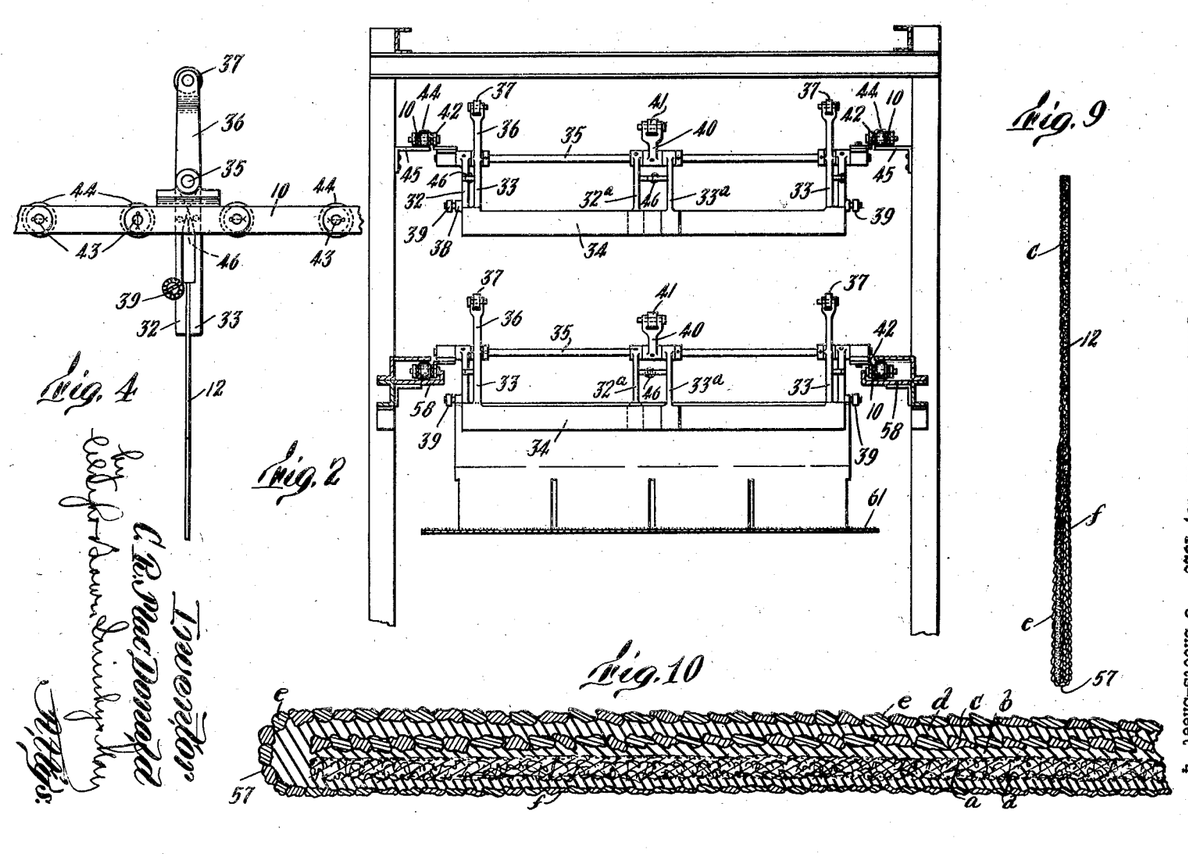
Figure 2 is a transverse section of the machine showing strip clamps in end view.
Figure 4 is a detail of a strip clamp with a fragment of the conveyor by which it is carried.
Figure 9 is a vertical section of a completed strip taken through one of the cut-outs.
Figure 10 is a section of the butt portion of the same on a larger scale.

Having outlined briefly the course of the shingle strip through the machine, I will now describe in more detail the various instrumentalities which are utilized in the successive steps. A clamp 11 for gripping and holding a unit is illustrated in Figure 4 on an enlarged scale. Each clamp may comprise a pair of jaws 32, 33 at each end of the sheet. The corresponding jaws at the opposite ends of the strip may be separate or may be connected as by the plates 34 (Figure 2) so as to engage the strip along the entire extent of its head portion. The connecting plates 34 may be additionally supported and reinforced as by arms 32a, 33a, the arm 32a being fixed to turn with the shaft 35 while the arm 33a is rockable on said shaft. The clamps 11 may be mounted upon a rod 35 supported at either end by the conveyors 10. The clamps 11 may be of any suitable construction. As shown in Figures 2 and 4, the jaws 32 are fixed to the bar 35 to turn therewith. The jaws 33 are rockably mounted on the rod 35 and have extensions 36 projecting upwardly therefrom, the upper portion of these projections being adapted as by rollers 37 to engage suitable cams hereinafter to be described. The jaws 32 are likewise provided with bosses 38 which are adapted to engage other cam surfaces as by rollers 39. At a convenient point on the rod 35 an arm 40 may be fixed adapted, as by a roller 41, to engage suitable cams in order to rock the rod 35 and the clamps 11 associated therewith. The rod 35 carrying the clamps 11 may be secured to the conveyors 10 as by brackets 42, each of which may be secured to a link of the chain conveyors 10. The pins 43 connecting the successive links of each conveyor 10 are preferably each provided with a roller 44 which is adapted to facilitate travel of the conveyor on guide brackets 45 and on guide tracks 58. A suitable spring 46 may be provided as shown in Figure 4 to keep the jaws 32, 33 normally pressed together, so that when the jaws are not positively separated, they will have a spring-pressed engagement with each other or with any object placed between them. Similar springs 46 may also be provided between the arms 32a, 33a.

Figures 5, 7, 16:
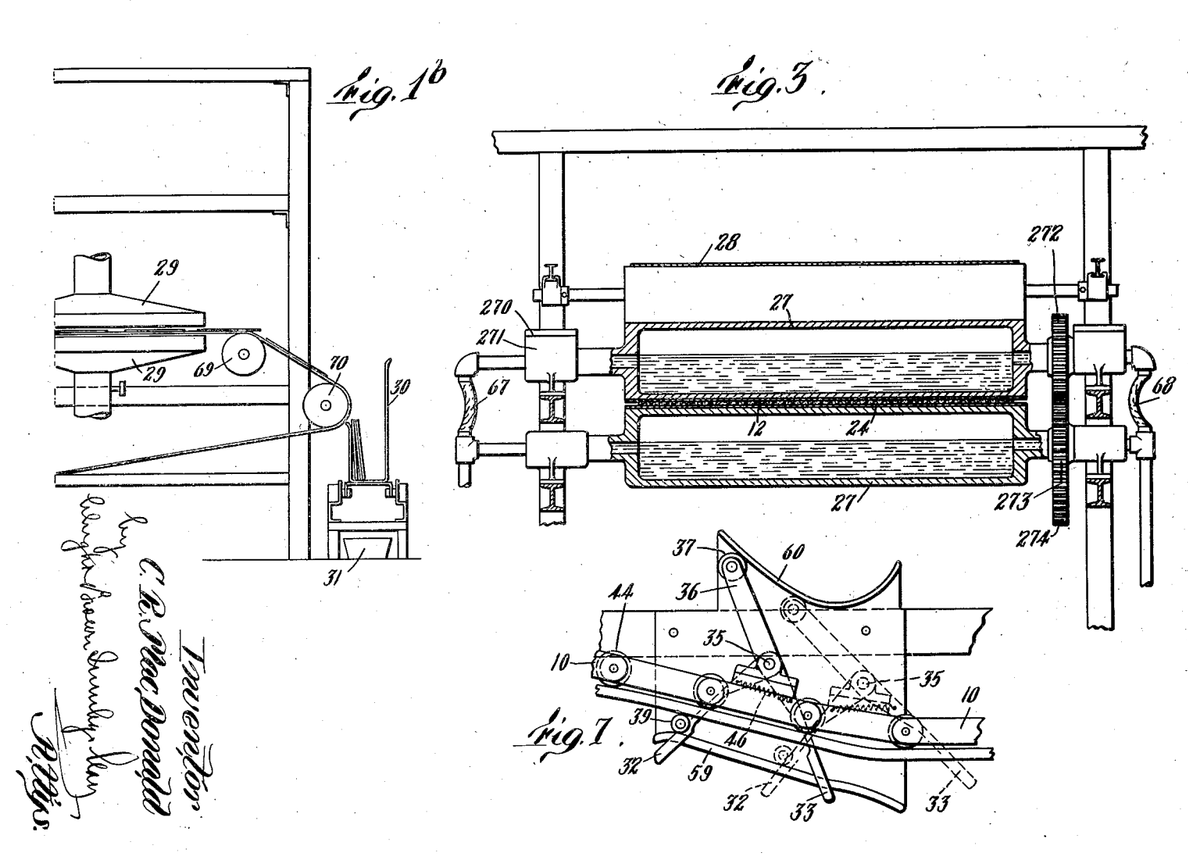
Figure 5 is a detail of the mechanism for seizing strips from the feeding conveyor.
Figure 7 is a detail of the mechanism for releasing the strip.
Figure 16 shows a modified form of coating mechanism.
Figure 5:
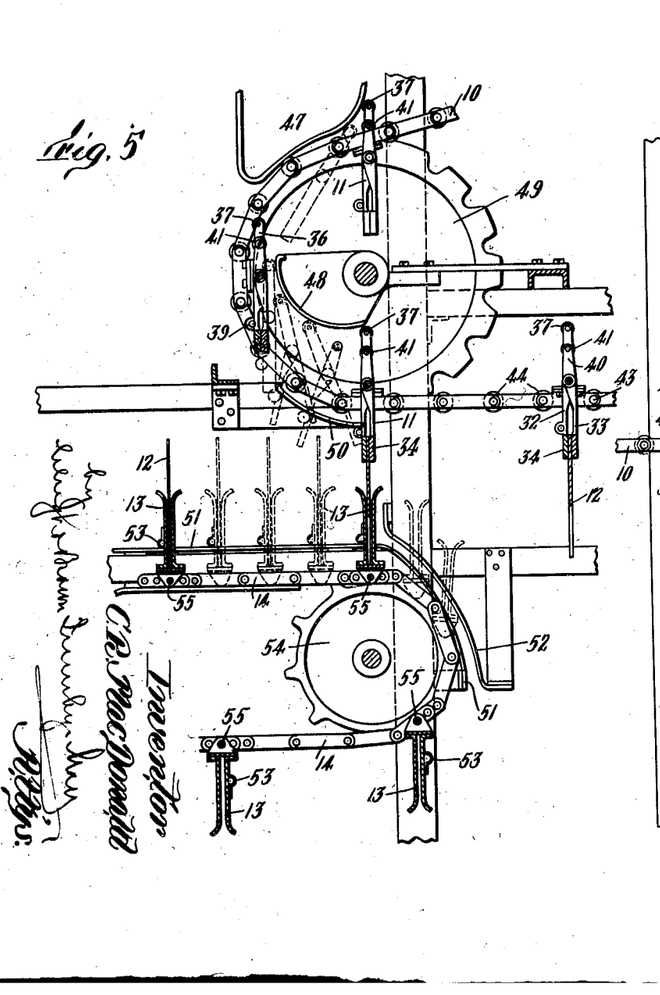

In Figure 5 is shown the apparatus for causing the clamps 11 to pick up successive strips from the holders 13 carried by the feeding conveyors 14. A cam surface 47 may be provided to engage the rollers 37 on the clamps 11 so as to tilt the clamps forwardly in their travel to escape fouling a cam 48 as they are carried with the conveyors 10 around a suitable sprocket wheel 49. As indicated by the successive dotted positions in Figure 5, the clamps 11 in passing around the sprocket wheel 49 bring the rollers 37 into engagement with the cam 48 while the rollers 39 engage the cam 50. The cams are so disposed as to cause the simultaneous engagement of the rollers 37, 39 therewith to open the jaws 32, 33 of the clamps 11 as the clamp is traveling downwardly so as to engage a strip 12, which is at the same time being advanced by the travel of a holder 13 carried by the conveyors 14. When a clamp 11 reaches the lowermost point of the sprocket 49 and is directly over one of the holders 13, the rollers 37, 39 ride clear from the cams 48, 50 and allow the spring 46 to close the jaws 32, 33 upon the strip 12. A pair of cams 51, 52 are preferably disposed so as to engage suitable rollers 53 carried by the holders 13 in such a way as to cause the holders 13 to retain a vertical position until they have descended about the sprocket 54 far enough to clear the bottom of the strip 12, which is now clamped and carried by clamps 11. The holders 13 are preferably attached pivotally to links in the conveyors 14 as at 55, and may be held in vertical position while carrying a strip 12 by a horizontal extension of the cam 51. Upon clearing the bottom edge of a strip 12, each holder 13 is allowed to swing downwardly and is conveyed back to the original feeding point where another strip 12 may be supplied to it by hand or by any suitable feeding mechanism.

Figure 6:
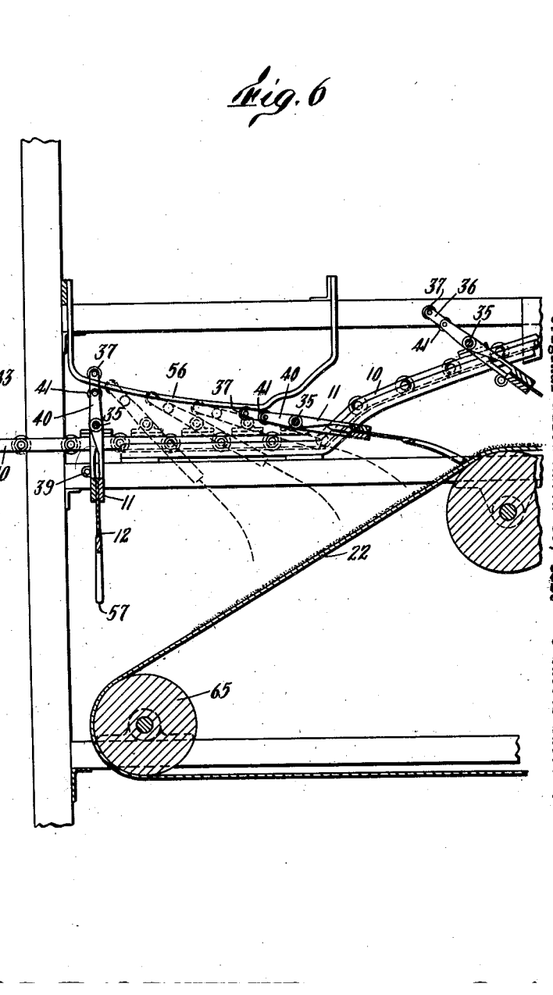
Figure 6 is a detail of the mechanism for tilting the clamps with their strips after the dipping step.

As has been previously described, the strips 12, after being gripped by clamps 11, are carried over a vat or other suitable container having a coating compound therein, which is preferably in liquid form. The conveyors 10 are then depressed as by a sprocket wheel 18 so as to cause the strip 12 to be dipped into the coating compound to a predetermined depth and removed therefrom while in a substantially vertical position, the drippings from the butt edge of the strip being removed as by a wiper 20. The clamp 11 is thereupon conveyed toward the grit-covered belt 22. A cam mechanism which is shown in detail in Figure 6 may be provided to tilt the clamp 11 backwardly so as to project the butt edge of the strip 12 forwardly immediately prior to its contact with the grit-covered belt 22. This may be done by means of a suitably shaped cam 56 on which the roller 41 is adapted to ride. As will be seen from the successive positions indicated in Figure 6, the cam 56 will tilt the clamp 11 backwardly as it goes along, thus swinging the butt of the strip 12 forward in the direction of motion. Although the strip 12 may in some cases sag on account of the flexibility of the material of which a manufactured roofing is customarily made, the tilt will be sufficient to cause the butt edge of the strip to contact the grit on the belt with the rearward portion of its butt edge, as indicated by the reference character 57 in Figure 10. After the butt edge of the strip has contacted with the grit-covered belt 22, the roller 41 rides free from the cam 56 and at the same time the conveyors 10 carrying the clamp 11 are caused to proceed upwardly on an arc indicated in Figures 1 and 1a, the direction of motion being governed as by a guide track 58 which may be of such a shape that the clamp 11 may straighten the strip 12 to a vertical position, with its butt end all the time in contact with the grit on the belt 22, and then may swing the strip forwardly until it is released by a suitable cam mechanism and allowed to drop on its forward face on the belt 22. The mechanism for causing the clamp 11 to release its strip is shown on an enlarged scale in Figure 7. An upper cam surface 59 may be provided to engage the rollers 39 of the forwardly tilted clamp 11 in such a way as to maintain the forward tilt of the jaw 32 on which the roller 39 is mounted. While the jaw 32 is maintained with a forward tilt, the rollers 37 are adapted to engage a cam 60 which is positioned to swing back the upper arm 36 of the jaw 33, and thus to separate the jaws 32 and 33, permitting the strip 12 to fall therefrom flat on the belt 22. The result of the motion of the clamp 11 on the track 58, which changes the tilt of the strip from a backward tilt to a forward tilt, is a rounding off of the butt edge of the strip with a simultaneous application of a surfacing of grit or other comminuted material which may be deposited on the belt for the purpose. When the strip is allowed to fall forwardly on its face, the coated portion of its forward face comes down upon the comminuted material on the belt 22 with a result that the surfacing of the butt edge is continued over the entire coated portion of the forward face. In order to recover and recycle the surplus comminuted material carried by the belt 22, the belt may be led around a guide roll 62 while the strip 12 carried thereon passes along horizontally to another conveyor or belt 24, the excess grit falling through the gap between the adjacent ends of the horizontal portions of the belts 22, 24. The belt 22 may be further led over suitable guide rolls such as 63, 64, 65, one of which, such as 63, may be movable in order to adjust the tension of the belt. Instead of using two conveyors 22, 24, it is obvious that the belt 22 may be extended so as to include the functions of the belt 24. As a result of using a single belt, the rolls 27 press the strip while its lower face is in contact with excess grit on the belt. This may be desirable when the nature or condition of the coating material is such that insufficient grit will stick to the strip unless greater pressure is applied to it than results from the weight of the strip itself. On the other hand, if desired, two successive endless belts may be used instead of the belt 24, the two belts having a gap between through which may fall the grit which is deposited on the belt from the hopper 26. If desired, a revolving brush 66 or other suitable means may be supplied in contact with the belt 22 to remove any coating material that might stick thereto, but ordinarily a cleaner will not be required. The belt 22 is preferably driven as by the roll 62 or any of the other rolls over which it passes, the speed of the belt being somewhat less than that at which the conveyors 10 are driven. This difference of speed enables the turning over of the strip 12, as previously described, during the travel of the clamp 11 along the track 58.

As the strip 12 leaves the belt 22, it is picked up by the belt 24, a roller or other device being positioned between the ends of the belts, if the size and material of the strips require, to prevent the units from falling through between the belts. The strip is thus carried along under a hopper 26 or other device for depositing any desired surfacing material upon the upper face of the strip. This surfacing material may be any desired comminuted material, such as crushed slate or grit of any kind, either in a single color or a combination of colors, which may be put on in bands or other patterns as desired. Instead of slate, grit or granular material of any kind may be used, or powdered mica, chalk, or electrically conductive material, or the equivalents of any of these. The belt 24 carrying the strip 12, the entire coated surface of which is now covered with one kind or another of comminuted material, may now be led between a series of rolls 27 which serve to embed the grit adhering to both surfaces of the strip, and also, if desired, to cool the strip. For this purpose, the rolls 27 may be constructed hollow as shown in Figure 3, suitable flexible connections 67, 68 being provided for circulating water, air or other cooling fluid through the rolls. In order to allow the upper rolls 27 to ride over the successive units without flattening out the tapered coating by excessive pressure, the bearing blocks 270, in which the rolls are journaled, may be mounted in vertical slides 271 so that the upper rolls 27 can rise as they ride over the increasing thickness of the unit passing beneath, pressing thereon simply with their own weight plus that of the liquid within. Excessive pressure can therefore be avoided by making these rolls of suitable size and materials to give the weight desired. It is evident that many other equivalent methods may be used to exert a yielding pressure on the tapered units sufficient to partially embed in the coating material a layer of comminuted material in contact therewith. The strips may, if desired, be cooled further by passing through any desired cooling device, such as the one indicated at 29. This may be an air cooler as shown, or more rolls may be used instead. When the strips 12 are sufficiently cooled, they may be deposited in a receptacle or carrier 30. By leading the belt 24 about suitably positioned guide rolls 69, 70, the strips may be deposited vertically in the carrier 30, the latter being preferably constructed so as to allow surplus material which has been carried along by the belt 24 from the hopper 26 to fall through and be recovered as by a receptacle 31.

The finished strip 12 will then have a complete envelope of coating material over its entire butt portion including both surfaces and all the edges. This coating will have been somewhat tapered by the action of gravity during the dripping of the excess coating material from the strip. A surfacing of one kind of material will cover the rounded butt edge and cut-out edges on one face of the coated portion of the strip. A surfacing of the same or different materials will cover the opposite coated face of the strip. As a result, the product is a substantial roofing unit with a fully protected exposed portion and a thickened butt edge tapering toward the head portion, which presents an attractive and substantial appearance to the roof when laid.

In Figure 10 is shown in cross section an example of the butt portion of a finished unit. In this case, the felted material $a$ has been saturated and has received a preliminary coating $b$ of waterproofing material with a surfacing of grit $c$, after which the sheet has been cooled and cut into units. These units are fed into the machine as hereinbefore described and acquire a continuous coating $d$, $d$ of high melting point asphalt or equivalent material on the butt portion of both faces and the butt edge, as well as on all the edges of cut-outs or notches in the butt portion. The coating $d$, $d$ is surfaced with the layers $e$, $f$ of comminuted material, the layer $e$ being on the face of the unit which is foremost as it progresses through the machine and being a continuation of the surfacing on the rounded butt edge. The layer $f$ may be of the same or different material as that of $e$, and meets the layer $e$ at or near the rearward portion 57 of the butt edge. The section in Figure 10 is illustrative only as it is obvious that the coating and surfacing as described may be applied to units of various other materials.

Figure 8:
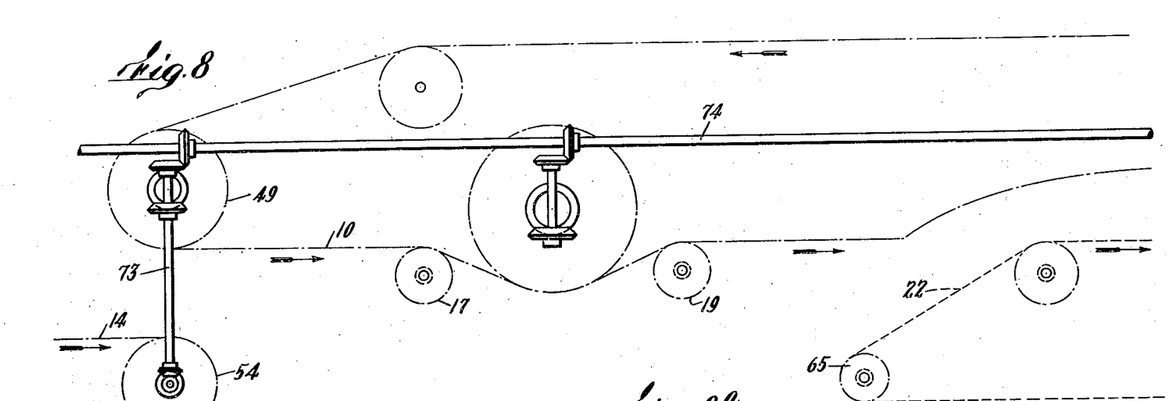
Figures 8 and 8a represent diagrammatically a system of driving mechanism for operating the machine.
Figure 8A:
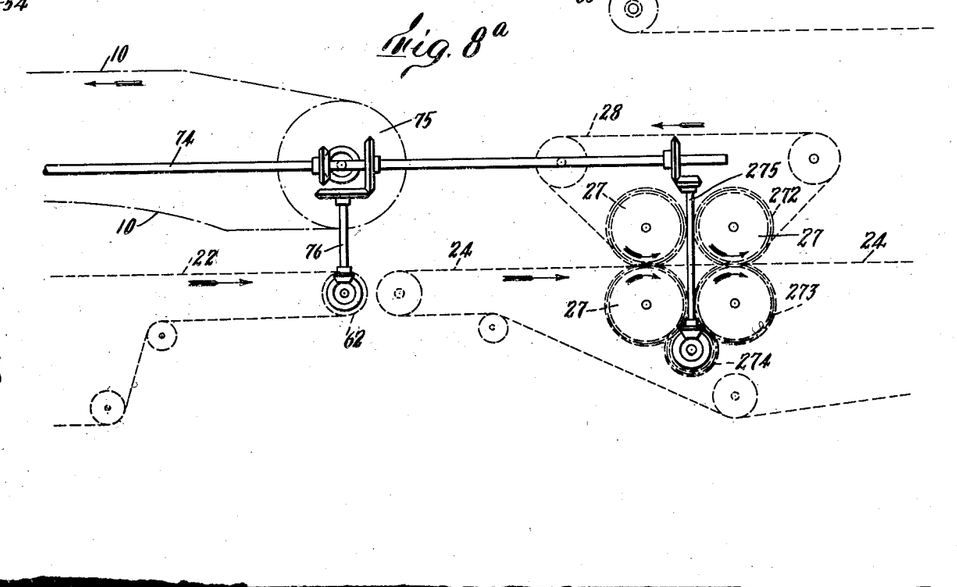

In Figures 8 and 8a, an outline of the driving connections is diagrammatically indicated. Power may be supplied by any suitable means to rotate a main drive shaft 74 to which the several driven elements may be operatively connected. As shown, the sprocket wheel 54, which advances the conveyors 14, is connected as by suitable gearing and a shaft 73 to the shaft 74. The sprocket wheels 18, 49 and 75, about which the conveyors 10 pass, are so geared to the shaft 74 as to be driven with equal peripheral speeds. The sprocket wheels thus cooperate with one another in advancing the conveyors 10. In order to drive the belt 22, the rolls 62 may be operatively connected to the shaft 74 as by a shaft 76 connected with suitable gearing. Instead of the direct connection shown, any of the variable speed transmission units, such for example as the Reeves drive, may be interposed between the roll 62 and the shaft 74, whereby the relation between the speeds of the conveyors 10 and the belt 22 may be readily adjusted to accommodate roofing units of different sizes. The belt 28 may be driven by the press rolls 27 which may be operatively connected to the shaft 74 by suitable gearing. As shown in Figures 3 and 8a, the upper rolls may be driven from the lower rolls as by gears 272, 273, the gears 273 also meshing with a gear 274 which is operatively connected as by a shaft 275 and suitable bevel gears to the power shaft 74. The belt 24 may be driven by the motion of the rolls 27 between which it passes. Further provision for driving the belt 24 may also be made by operatively connecting any of the other rolls which it engages with the power shaft 74. As previously mentioned, the gearing connecting the rolls 62 with the drive shaft 74 is so arranged as to give the belt 22 a somewhat lower speed than the conveyors 10 in order that the head of the strip 12, which is tilted backwardly when the butt edge contacts with the belt 22, may overtake the butt edge during the travel of the clamp 11 along the track 58 so that the strip will be forwardly tilted when the clamp 11 lets go.

Figures 11, 12, 13, 14, 15:
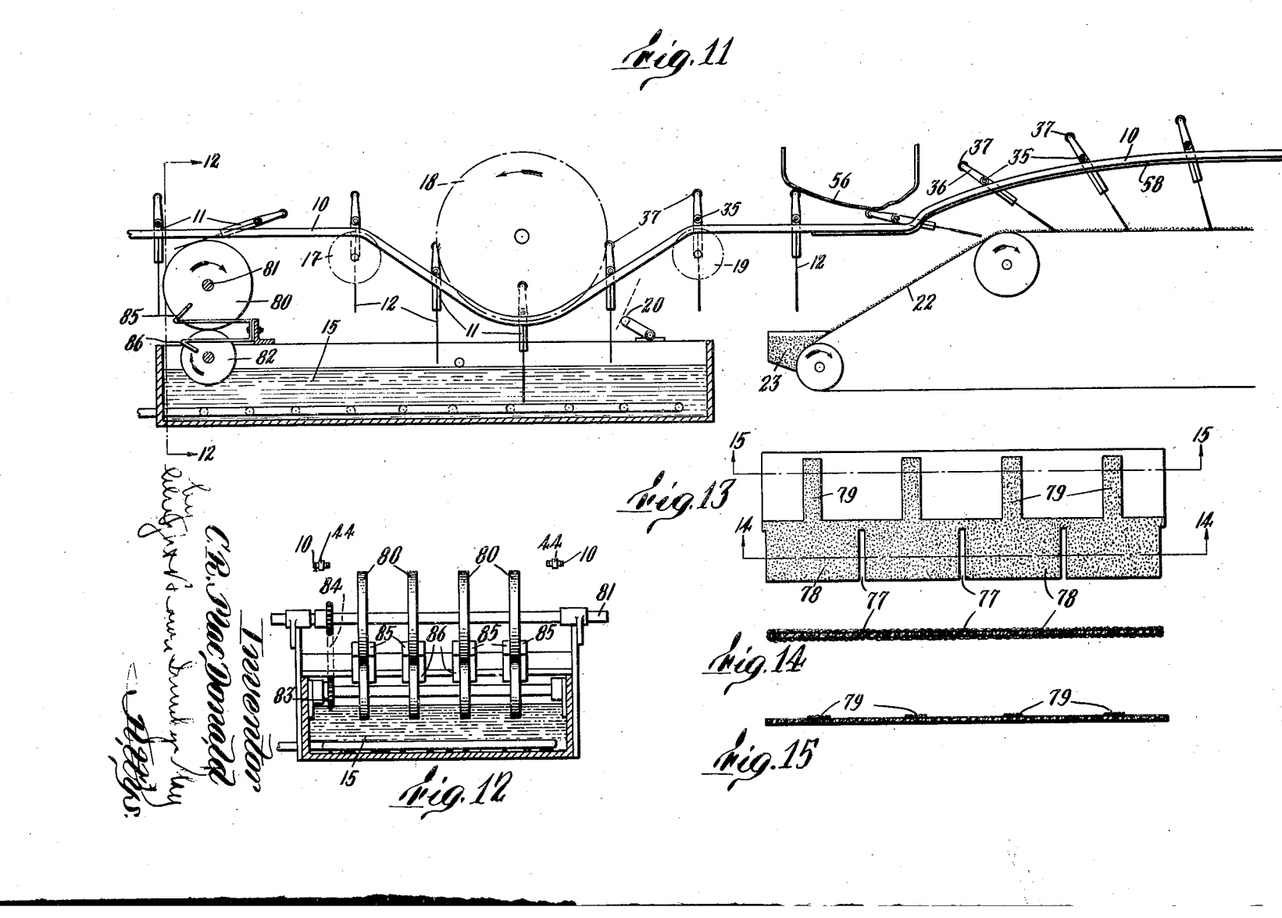
Figure 11 shows an attachment for applying coating in narrow stripes to the head portion of the strips.
Figure 12 is a section on the line 12—12 of Figure 11.
Figure 13 shows a shingle strip coated by the mechanism shown in Figure 11.
Figure 14 is a section on the line 14—14 of Figure 13.
Figure 15 is a section on the line 15—15 of Figure 13.

In Figure 11 is illustrated an attachment by which the machine may be used to produce the type of shingle strip illustrated in Figure 13. These strips are made with cut-outs 77 to form shingle-simulating tabs 78. In order to give a maximum protection with a minimum amount of coating material, it is desirable to apply narrow stripes 79 of grit-surfaced coating to the head portion of the strip, these stripes 79 being preferably positioned half way between the slots 77 so as to lie under the slots of the strip in the course immediately above as laid on the roof and give full protection just where it is needed. These stripes of coating 79 may be applied by a series of coating rolls 80 which may be supported as by a suitable shaft 81 over the container 15 from which coating material is supplied to them as by feed rolls 82. The shaft 81 is preferably connected to the power shaft 74 by suitable gearing so as to drive the coating rolls 80 with a peripheral speed equal to the linear speed of the conveyors 10. The feed rolls 82 may also be driven by any desired means, such as sprocket wheels 83 and a chain 84. In order to prevent coating material from cooling on the sides of the rolls 80 and thus increasing the virtual widths of these rolls in a manner to deposit stripes 79 of excessive or irregular width, suitable scrapers 85, 86 may be provided for the sides of the rolls 80 and 82, respectively, to confine the coating material to the peripheral surfaces of these rolls. The rolls 80 are positioned at such an elevation that their peripheries will contact the strip 12 at suitable points near the top thereof. The progress of the strip will draw it over the rolls 80 from which it will receive on its forward face stripes 79 of coating material which will be of the same width as that of the rolls 80. As will be seen from Figure 11, the butt portions of the strips may thereupon be dipped into the material in the vat so that the stripes 79 merge into the envelope coating of the butt portion as indicated in the strip illustrated in Figure 13. If desired, the striping rolls 80 may be placed at the other end of the container 15 so as to apply the stripes of coating to the head portions of the strip after it has been dipped. The subsequent steps of applying comminuted surfacing material to the coated areas are then followed as have been hereinbefore described.

Figures 16, 17, 18, 19:
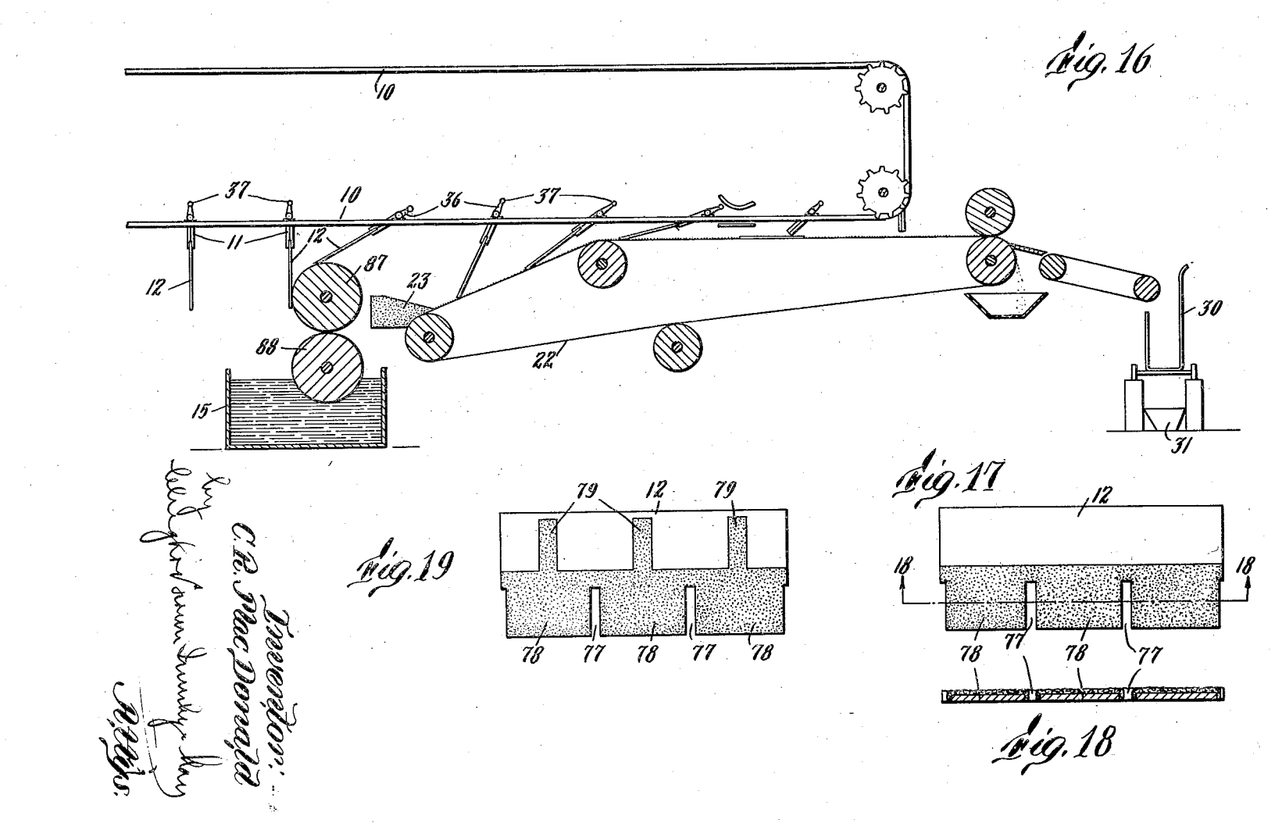
Figure 17 shows a strip coated by the mechanism shown in Figure 16.
Figure 18 is a section on the line 18—18 of Figure 17.
Figure 19 shows a strip coated by a mechanism as that shown in Figure 16 with an attachment as shown in Figure 12.

A still further form of thickening may be produced by a modified form of the coating apparatus as illustrated diagrammatically in Figure 16. Instead of dipping the strips into the material, a suitable coating roll 87 may be used to receive coating material from a feed roll 88 and deposit it on the butt portions of the forward face of strips which are brought into contact with it and led over it. If desired, striping rolls 80 may precede or follow the roll 87 so as to produce stripes 79 on the head portion as shown in Figure 17. The strip which has been coated by the mechanism shown in Figure 16 will have a structure like that indicated in Figures 17 and 18 wherein the strip has a somewhat tapered coating surfaced with grit material on one side only, the stripes 79 on the coated side being applied by striping rolls 80 such as are shown in Figure 12.

Having thus described certain embodiments of my invention, it should be evident to those skilled in the art that many changes and modifications might be made therein without departing from its spirit or scope as defined by the appended claims.

I claim:—

1. Apparatus of the class described, comprising means for seizing and holding suspended a strip shingle with butt edge lowermost, a liquid container, means for conveying said seizing means and strip over said container, means for lowering said holding means whereby a strip held thereby is lowered to a predetermined depth in said liquid, and raising the holding means whereby to remove a strip held thereby from said liquid, and means for causing said seizing means to release said strip.

2. Apparatus of the class described, comprising means for coating a portion of the surface of a roofing unit, means for removing the unit from the coating means, means for swingably suspending said unit during said coating and removing of the unit and means for doctoring said unit as it is removed from the coating means.

3. Apparatus of the class described, comprising means for coating a portion of the surface of a roofing unit, including its butt edge, means for rounding off the coating on said butt edge and means for doctoring said unit.

4. Apparatus of the class described, comprising means for coating a portion of the surface of a roofing unit with impervious material, means for rounding off said coated edge and surfacing said edge and the coated portion of a face of the unit with comminuted material and means for doctoring said unit after the coating operation.

5. Apparatus of the class described, comprising means for coating a portion of a roofing unit including the butt edge thereof with impervious material, a movable grit-receiving member, means for depositing grit on said member, means for causing contact of said coated butt edge with said grit, and means for turning said strip on said edge as an axis while said edge is in contact with the grit on said member.

6. Apparatus of the class described, comprising means for coating a portion of the surface of a roofing unit including the butt edge thereof, and means for rounding off said coated edge and applying a continuous surfacing of comminuted material to said edge and the coated portion of one face of the unit.

7. Apparatus of the class described, comprising means for applying stripes of coating material to a face of a roofing unit, means for applying coating material to the butt portion of said face, and means for swingably suspending the unit during the operation of both said coating means.

8. Apparatus of the class described, comprising means for applying stripes of coating material to a face of a roofing unit, means for applying coating material to the butt portion of said face, means for removing the unit from said coating means, and means for swingably suspending the unit during said removal.

9. Apparatus of the class described, comprising a container for liquid waterproofing compound, an endless carrier, means for depositing grit on said carrier, means for suspending a roofing element with its butt edge lowermost, means for dipping said roofing element into said compound and removing the strip therefrom while thus suspended, means for advancing the strip toward said carrier, means for placing the butt edge of the tilted strip on said grit, means for turning the strip forwardly on said edge until it is prone on the grit, and means for depositing grit on the upper surface of the strip.

10. Apparatus of the class described, comprising means for advancing a body of loose grit, means for depositing a pre-formed, coated roofing element on said grit whereby said element is carried thereon, means for depositing additional grit upon the element, and means for pressing the grit against both sides of said element as it is carried along with said body of grit.

11. An apparatus for coating and surfacing roofing units comprising means for advancing a plurality of roofing units, a container for coating compound, means for causing the butt portions of the successively advancing strips to be engaged with coating compound within said container, means for successively withdrawing the units from the container in a substantially vertical position and means for applying comminuted material to the coated areas of the units during their successive advancement from the container.

12. An apparatus for coating shingle units comprising means for horizontally advancing a plurality of units, a container for coating material, means for successively depressing the units into engagement with the coating material in said container whereby to surface the lower portions of said units including their butt edges and means for successively rounding off the coating on said butt edges of the units after they are successively removed from the coating container.

13. An apparatus for coating and surfacing roofing units comprising a bath of coating material, a pair of press rolls, means for partially dipping a series of units successively in said bath and for raising the units from the bath with their butt edges lowermost, means for applying comminuted material to the coated surface, and means for feeding the units thus treated to said press rolls.

14. Apparatus of the character described, comprising means for forcibly gripping a roofing unit and conveying said unit through a bath in a position whereby excess coating material will drain therefrom into the bath, means for applying comminuted surfacing material to the coated faces of the unit, and means for pressing the surfaced faces of the unit.

15. Apparatus of the character described, comprising means for forcibly gripping a roofing unit, means for conveying said unit as thus gripped through a coating bath in position to apply coating material to the butt portion of said unit, means for removing the unit from said bath, and means for swingably suspending the unit during said removal.

16. Apparatus of the character described, comprising means for forcibly gripping roofing elements and conveying them through a coating tank in position for applying coating material to the butt portion of the elements, said means being arranged to permit excess coating material to drain from the faces of the element, means for positioning said elements in a substantially horizontal plane after removal from the bath, means for surfacing the elements while in the last named position.

17. Apparatus of the character described, comprising means for gripping and advancing roofing elements, a container for coating compound, said means being adapted to convey the elements through said container in substantially vertical position, means for positioning the elements after they leave the bath in a substantially horizontal plane, and means for applying comminuted material to the coated areas of the elements while in the last named position.

18. Apparatus of the character described, comprising an endless conveyor, means carried by the conveyor for swingably suspending roofing units, a container for coating material, means for causing the butt portions of the units to be dipped into the material in said container, means for applying surfacing material to the coated portions of the units after removal from the container.

19. Apparatus for treating roofing units, comprising mechanism for gripping and advancing units in substantially vertical position through a bath of coating material, means cooperating with said gripping mechanism for moving said units to substantial horizontal position after they leave the bath, and means for applying granular surfacing material to said units while advancing in horizontal position.

20. Apparatus for treating roofing units, comprising a pair of press rolls, means for gripping a series of units and advancing them successively through a bath of coating material in position to permit excess coating material to be removed from the coated faces of the units, means for positioning the units in a plane substantially at right angles to the plane in which they are positioned during passage through the coating material, means for applying granular surfacing material to the coated faces of the units as they are advancing, and means for feeding the units in said position to said press rolls.

21. An apparatus of the character described, comprising means for forcibly gripping roofing units and conveying said units through a bath in a position whereby excess coating material will drain therefrom into the bath, means for successively releasing the units and causing them to advance in a horizontal position after they have left the bath, and means for applying surfacing material to the coated units while in said horizontal position.

22. An apparatus of the character described, comprising means for forcibly gripping roofing units and conveying said units through a bath in a position whereby excess coating material will drain therefrom into the bath, means for successively releasing the units and applying comminuted surfacing material to the coated surfaces thereof and means for pressing the surfaced faces of the units.

23. An apparatus of the character described, comprising means for successively gripping roofing units and conveying the same successively through a bath while maintaining them in a position whereby excess coating material will drain therefrom into the bath, means for successively releasing the units and means for advancing the same in a horizontal position after they have left the bath, means for applying surfacing material to the thus coated units while advancing in a horizontal position, and means for pressing the surfaced faces of the units.

24. A machine of the character described, comprising means for gripping shingles, means for conveying such shingles through a coating bath, with the butt ends of the shingles lowermost, means for shifting the shingles to a substantially horizontal plane and means for applying comminuted material to the coated areas of the shingles while in the last named position.

25. Apparatus for treating roofing units comprising in combination, a pair of press rolls, means for gripping a series of units and advancing them successively through a bath of coating material, while maintaining one edge of the units at a plane lower than the other to permit excess coating material to be removed from the coated faces of the units, means for positioning the units in a plane substantially at right angles to the plane in which they are positioned during passage through the coating material, means for applying granular surfacing material to the coated faces of the units as they are advancing, and means for feeding the units in said position to said press rolls.

26. An apparatus for coating and surfacing roofing units in a continuous operation, comprising means for gripping the roofing units and conveying the same through a bath while maintaining them in a position whereby excess coating material will drain therefrom into the bath, means for lowering the units, successively, into the bath and means for applying comminuted surfacing material to the coated faces of the units after they have been successively removed from the bath.

27. An apparatus for coating and surfacing shingle units, comprising a conveyor, a plurality of grippers on the conveyor adapted to forcibly grip a plurality of roofing units and maintain them in a substantially vertical position, a container for coating material, said conveyor being adapted to successively advance the roofing units through the coating material in said container, means for automatically effecting the successive release of the units from the grippers after their removal from the coating bath, means for successively advancing the units as thus coated and means for applying surfacing material to the coating units during their advancement.

28. An apparatus for treating roofing units comprising: means for coating the units, means for shifting the positions of said units after they have left the coating zone, means for applying comminuted material to the coated faces thereof and means for pressing the comminuted material into the coated surfaces while the units are advancing.

29. A shingle coating machine comprising means for gripping a shingle, means for conveying said shingle through a bath in a position whereby excess coating material will drip therefrom into the bath, means for powdering one side of the shingles, means for gritting the other side of the shingles, and means for pressing the gritted side of the shingles.

30. A shingle dipping machine comprising means for gripping shingles, means for conveying said shingles through a coating bath in a position other than a horizontal whereby excess material will drip therefrom, means for tilting said shingles to a position approaching a horizontal one, means for powdering the under sides of the shingles, means for applying material to the upper sides of the shingles, and means for rolling said last named material into the coating material.

31. The combination with a shingle coating machine comprising a liquid tank, an endless conveyor, means carried by the conveyor for gripping shingles, said means being yieldably and rotatably mounted, means cooperating with the shingles for moving the same to positions approaching a horizontal after they leave the bath, means for applying powder to the under sides of the shingles, means for applying grit to the upper sides of the shingles and means cooperating with the yieldable and rotatably mounted gripping means for forcing said gripping means to shingle released position.

32. The combination with a shingle dipping machine having an endless chain conveyor, a coating tank in which shingles are dipped, means for applying granular material to the coated portions of the shingles after the dipping operation and after they have been moved into different planes, of means carried by the conveyor for yieldably and rotatably supporting said shingles.

33. In a shingle coating machine, a coating tank, grit applying means, powder applying means, a conveyor, rotatable gripping means carried by said conveyor adapted to carry shingles through said tank in substantially vertical position, and means adapted to tilt and hold said shingles in substantially horizontal position while passing said grit and powder applying means.

34. A shingle coating machine comprising means for conveying shingles through a bath in substantially vertical position, means cooperating with said first named means for tilting said shingles to substantially horizontal position upon removal from said bath, means for powdering one side of said shingles, and means for gritting the other side of said shingles.

35. A shingle coating machine, comprising means for conveying shingles through a bath in partially submerged substantially vertical position, means cooperating with said first named means for tilting said shingles to substantially horizontal position upon removal from the bath, means for holding said shingles in tilted position as they pass through the machine, means for powdering the under side of the shingle, and means for gritting the upper side of the shingle.

36. In a shingle coating machine, a coating tank, grit applying means, powder applying means, and a conveyor adapted to carry shingles through said tank in substantially vertical position and through said grit and powder applying means in substantially horizontal position.

37. In a shingle coating machine, a coating tank, grit applying means, powder applying means, a conveyor adapted to hold shingles in substantially vertical position in passing through the coating tank and in substantially horizontal position in passing the grit and powder applying means, and means for pressing the grit in the coating.

In testimony whereof I have affixed my signature.

CHESTER R. MacDONALD.